Sept. 13, 1949.   J. F. DREYER   2,481,830
OPTICALLY POLARIZING DICHROIC FILM
AND METHOD OF PREPARING THE SAME
Filed May 14, 1946
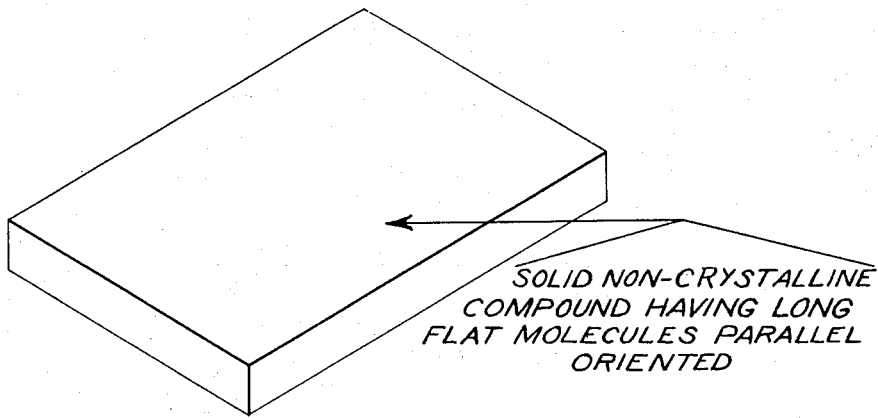
SOLID NON-CRYSTALLINE COMPOUND HAVING LONG FLAT MOLECULES PARALLEL ORIENTED
INVENTOR
JOHN F. DREYER
BY
Blair, Curtis + Hayward
ATTORNEYS Patented Sept. 13, 1949

2,481,830

UNITED STATES PATENT OFFICE 2,481,830

OPTICALLY POLARIZING DICHROIC FILM AND METHOD OF PREPARING THE SAME

John F. Dreyer, Springfield, Ohio, assignor to The General Polarizing Company, Cincinnati, Ohio, a corporation of Ohio Application May 14, 1946, Serial No. 669,697

21 Claims. (Cl. 88—65)

This invention relates to light polarizing devices and to methods of making the same.

It is known that many substances develop qualities of color and dichroism by relatively minor changes in the complex molecular structures of dyes, dye intermediates, and related compounds. Thus, colorless, so called "halochromic" compounds are known to develop color upon exposure to acids or acidic materials; other colorless "solvatochromic" compounds develop color by molecular addition; other compounds are known to develop color upon exposure to moisture or upon being subjected to dehydration; and still others, among which are the commonly known "indicators" develop a characteristic color when exposed to a particular pH or pH range. I have discovered and have previously disclosed in my copending applications, Serial No. 217,249, filed July 2, 1938, now abandoned; No. 263,779, filed March 23, 1939, now abandoned; and No. 384,550, filed March 21, 1941, Patent 2,400,877, May 28, 1946, of which this application is a continuation-in-part, that such changes may be made while the molecules are oriented in non-crystalline films without destroying the film, its non-crystalline nature or its orientation. Thus, I may select a material for film formation with the molecular character best adapted to give the physical properties desired, e. g., for film formation, for adhesion, for orientation, etc., and then the molecule can be modified to product the desired color and dichroism, even though such modification would impair the properties utilized in forming the oriented film. In this way, I have been able to produce some of the best light-polarizing films yet made.

I have also discovered that materials applied and molecularly oriented in solution and dried, can then be rendered insoluble and/or their qualities otherwise improved by chemical treatment while kept as a solid film and without re-dissolving or disturbing the orientation.

The exact nature of the changes taking place due to the treatment of the film are not fully understood and my invention is not dependent upon any explanation or theory concerning them. I have used for this purpose, mild reducing agents, mild oxidizing agents, metal salts, acids and bases, with ordinary salt formation and with formation of addition salts, or mere change of pH, and I have used nitration, denitration and chlorination. Hydration and dehydration may produce similar changes according to my invention, but hydration must be under conditions or with films such as to avoid dissolving the material, and these effects should not be confused with changes due to re-crystallization resulting from presence of water or other solvent. Moreover, it is important that the treated products should be stable and the reactions not reversible upon exposure to the atmosphere under conditions of ordinary use.

The nature of the treatment according to my invention and the fact that they produce alterations in color and dichroism without radical change in the general character of the molecules is not my invention but has been well known and is being more thoroughly studied by others. I have found that, surprisingly, these changes can take place in a molecularly oriented non-crystalline film without disturbing the oriented relations of the molecules, although any dissolving of the film would destroy the orientation. Even where these changes are such as to make the molecule difficult to orient, if the changes are made in a film of which the molecules already in an oriented condition, the orientation is fully maintained. Moreover, I have found that often, especially where atoms or groups are added to the sides of the molecules, such after treatment of the film has the effect of making it more permanent, more resistant to solvents, to light, to heat and to wear, and more adherent to the base on which it is carried.

By the use of my invention, it is no longer necessary to compromise between the properties necessary on the one hand to give satisfactory film and capacity for orientation by commercially feasible procedures; and on the other hand the desired color, polarizing capacity, insolubility and/or permanence. I now can select the best permanent colors with most efficient polarizing effect, and then by use of an intermediate from which it is formed or by intentional modification of its molecule to give properties desired for film formation and orientation, I can subsequently form or regenerate the desired polarizing substance, in situ, in the film. Or, conversely, I may select a material having the desired properties for formation of the oriented film and then, by suitable treatment of the solid film in situ, I may introduce the chemical groupings or linkages or both necessary to give the desired color, polarizing capacity, or other properties, as may be desired. By "color" in this specification, I mean to include not only selective absorption in one portion of the visible spectrum but also absorption throughout the visible spectrum to give a gray or black appearance.

It is important that the treatment of the oriented film shall be carried out under conditions which do not redissolve or melt the original film, but frequently the treatment, according to my invention, may have the effect of making the film resistant to solvents.

The materials used according to my invention are those which are potentially polarizing, that is to say, which may be converted to a light polarizing material by a change of the molecular structure such as does not destroy the general geometrical form or character of the molecule.

The potentially polarizing material may be applied for the formation of the oriented film either as a liquid solution or in a fused condition and then oriented by bringing into the nematic state while subjected to an orienting influence as described and claimed in my prior copending application Serial No. 384,550, filed March 21, 1941; or it may be applied in a plastic condition or in a plastic composition and oriented by viscous flow or "smearing" or by stretching of the film or by other known methods of orientation. In any case, according to the present invention, the film thus formed is converted to the desired efficient and stable light polarizing condition by a chemical treatment subsequent to the film formation.

The drawing gives a diagrammatic representation of a glass plate provided with a light-polarizing film pursuant to the invention.

As one example of my present invention, a glass surface, treated with a thin film of methyl cellulose and rubbed along parallel lines to develop an orienting anisotropic surface in accordance with my companion application Serial No. 384,550, may be coated, e. g., by dipping, spraying or flowing, with a film of liquid consisting of a concentrated solution (i. e., molecular dispersion) of Brilliant Yellow, the dye commonly identified by color index No. 364 and which is understood chemically to be

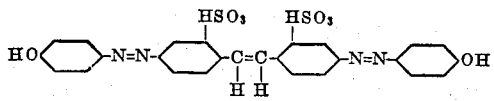

in a suitable solvent, for example, methanol. A thin uniform continuous film of this solution is thus applied to the prepared surface and is thereafter dried by exposure to a gentle flow of air at approximately 70° F. The film upon drying will be a dichroic film, uniformly oriented in accordance with the lines of rubbing. In ordinary light the film will be transparent and tinted yellow, but in plane polarized light the transmission is cut down to a fraction of that in ordinary light and the yellow becomes very much deepened to an intense golden color.

According to the present invention, I treat this resulting film by dipping in, or otherwise applying, an acid solution, e. g., a stannous chloride solution of about 2.0 pH, which changes the yellow coloration to a black which in ordinary light is transparent, cutting down the intensity of incident light to some extent but without substantial change in coloration, whereas, with plane polarized light and crossed with respect to the electrical vector of the polarized light, the film appears black and allows only a small fraction of the light to pass therethrough. The molecular change produced is believed to result in a compound having the formula

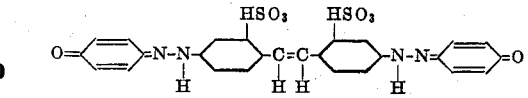

or the corresponding amine or quaternary ammonium salt. The development of the chromophoric quinoid groups is apparently responsible for the improvement in the polarizing efficiency. Although this effect on the dye is produced by acids generally and is apparently analagous to the well-known effect of change of pH on indicator materials, which is used in chemistry for pH determination and control, it is important for my purposes to use a material which forms a stable compound. Thus, for example, with a volatile acid such as hydrochloric, the reaction is reversible with gradual loss of the acid and a gradual reconversion of the film to the yellow form. I prefer for this purpose to use an acidic salt such as stannous chloride, zinc chloride, cuprous chloride or aluminum chloride. Other acidic materials which do not suffer loss of the acid ion may be used in a similar manner, e. g., phenol sulfuric acid.

Instead of the dye mentioned above, I may use in like manner a modified #364 dye, also sold as Brilliant Yellow, which has m-cresyl groups in place of the phenol groups indicated above.

Another example of my invention is a dye known as Zapon Fast Blue HL, which is commercially available as a lacquer color under that name, being a product of General Dyestuffs Corp., and which is understood to be a highly sulfonated copper phthalocyanine combined with higher aliphatic dimethyl amines, (ordinarily the commercial mixture of higher aliphatic tertiary amines known as "lorol" dimethyl amine). This dye may be applied to a clean brushed glass surface at room temperature in concentrated solution in methanol. The film may be of a thickness which naturally adheres to the plate after dipping or flowing. This film is dried by exposure to a gentle flow of air at 70° F. When the film is dry it is transparent and slightly tinted a blue-green in ordinary light and in plane polarized light when angularly arranged to pass such light. When arranged at the extinction angle in plane polarized light, however, the coloring becomes an intense blue-green. Upon treatment of this film in accordance with my invention, with a concentrated aqueous solution of stannous chloride, rinsing with clear water and drying, the color is changed to purple and the polarizing efficiency is increased.

Other sulfonated metal phthalo cyanines can be used sucessfully in similar manner according to my invention.

As another example, a zinc free methylene blue film may be applied to a clean glass surface in methanol solution and dried rapidly substantially as described in my copending application Serial No. 384,550, and then heated to about 100° C. to drive off water of hydration and then treated with a solution consisting of 25 parts by weight of zinc chloride and 75 parts by weight of water. This results in conversion of the film from a colorless condition to a blue dichroic film.

Instead of dipping in zinc chloride solution,

I may dip the dried film in a saturated solution of potassium dichromate and 2 per cent concentrated sulfuric acid, then rinse in clear water and air-dry. A protective film may be applied to the surface by dipping in a 5 per cent toluol solution of methyl methacrylate and again air-dried.

Instead of dipping the methylene blue film in zinc chloride solution, it may be treated with an alkaline solution, e. g., ammonium hydroxide in high concentration, whereupon the film is made dichroic and exhibits a red-purple color.

When a self-contained dye film is desirable or when for other reasons a thick film is sought, thicker films than those which can be laid down at a single wetting may be provided by successive applications with or without intermediate treatment. For instance, an aqueous solution of Benzo Fast Blue FR may be applied to an oriented surface, allowed to pass through the nematic state in which it will partake of the orientation of the surface and solidified while oriented and then dipped in aluminum chloride to render it water resistant. One or more subsequent layers of water solution of this dye are thereupon applied with intermediate treatments with aluminum chloride until built up to the desired thickness. In instances where films composed of several dyes as set forth and claimed in my copending application Serial No. 669,698, filed herewith are desired, thick films may be formed by successive applications of different dyes. For instance, Benzo Fast Blue FR may be applied and made water resistant with aluminum chloride as above and then covered with Chloramine Yellow, (color index #631).

With non-crystalline molecularly oriented films, it is important to avoid residues of unreacted crystalline reagents. This may be controlled by adding predetermined proportions, e. g. by dipping or spraying treatments controlled to give predetermined thickness of standard solutions; or as set forth above the films may be washed after the treatment to remove any residue which has not combined with the potentially polarizing substance.

Instead of orienting the material by taking advantage of the nematic state in accordance with my invention described and claimed in my said prior copending application, I may orient the potentially dichroic material by other known means of orientation. Thus, for example, a solid methylene blue may be plasticized with glycerine or phosphoric acid, and the resulting plastic mixture may then be spread by a doctor blade, spatula or other means over a clean isotropic surface. The film will be found to be oriented along the lines of spreading. This film may be treated as described above with potassium dichromate and sulfuric acid.

As an example of development of the desired properties in a molecularly oriented film by a reduction treatment, I may apply a true solution of Naphthol Blue B (color index #246) to a glass base in accordance with the method described and claimed in my said copending application No. 384,550, and the resulting dried film may then be subjected to reduction by exposure to a flow of hydrogen gas at a temperature of 25° C. or by dipping in a concentrated solution of sodium nitrite. The film is thus reduced to Azo Dark Green which exhibits a strong dichroism and a dark green color. In general, the chemical treatments which may be used on the solid oriented films in accordance with my invention include oxidation, e. g., by potassium bichromate mixed with a strong mineral acid, e. g., hydrochloric or sulfuric, by hydrogen peroxide, or by chromic acid, etc., or mild reduction; or formation of a double salt, e. g., with zinc chloride, mercurous chloride, stannous chloride, sodium nitrite, etc.; or adsorption, e. g., by sodium bichromate, potassium bichromate, etc.; or combination with acids or bases, e. g., with tannic acid, succinic acid, sodium hydroxide, calcium hydroxide, ammonia, etc.; or addition or substraction of groups, e. g., nitration, chlorination, etc.; or change of pH.

I have also found that coordinate bonds in the molecules have a significant action producing or increasing dichroism and also the heat and light resistance of the polarizing film. Thus, for example, the oriented film can be improved by bathing in a solution of a metal salt, for example, a solution of zinc chloride or zinc ammonium chloride, or cadmium iodide in which the dye becomes mordanted.

If the dye film is warmed up to about 100° C. to drive off water of hydration before treating, e. g., with a solution of zinc chloride, the dichroism resulting will be enhanced. Experience has shown that the best concentration of zinc chloride to use is in the neighborhood of twenty-five parts by weight of zinc chloride and seventy-five parts water. Increase of the water content reduces the amount of dichroism produced while increase of the salt content tends to increase the solution of the dye.

These or other chemical changes may also alter specific properties of the oriented material without destroying its ability to polarize light. Thus, with many of these dyes the treatment with sodium bichromate plus an acid will not only improve the pleochroism but will also increase the water resistance. Likewise, a nitration treatment improves the resistance to light, thus increasing the useful life of the material. The use of cadmium iodide as the mordanting chemical prevents the reformation of the liquid crystalline nematic state.

Although in the foregoing specification I have described a preferred embodiment of my invention and have suggested various alternatives and modifications thereof, it is to be understood that these are not intended to be exhaustive nor limiting of my invention, but on the contrary, are given with a view to illustrating and explaining the principles of the invention and their embodiment in practical use in order that others skilled in the art may be enabled to adapt and modify them in numerous embodiments and with numerous modifications each as may be best adapted to the conditions of a particular use.

I claim:

1. The method of preparing a solid dichroic polarizing film which comprises forming an intermediate dichroic film wherein the molecules are oriented in parallel with other adjacent molecules, said intermediate film being a solid which is itself unsuitable as a permanent polarizer but is convertible into a permanent dichroic material which has polarizing properties and which is stable on exposure to light and air, and after the orientation is completed, treating said finally-oriented intermediate with a non-solvent of said intermediate and of said dichroic material which will chemically convert said oriented intermediate in situ, and at a temperature below the melting points of both said intermediate and said dichroic material, without further orientation into a permanent dichroic film while still in the solid state and while said final orientation remains unaffected.

2. A process as set forth in claim 1 wherein the intermediate film is formed of pH-sensitive material having relatively long molecules of flat structure, and wherein said film develops a darker color upon reaching a predetermined pH range different from that at which the finally-oriented film is formed and wherein the pH of the film is then adjusted to said range of darker color.

3. A material as set forth in claim 1 wherein the intermediate film is formed of an organic nitrogen-containing compound having relatively long molecules of flat structure and which develops a chromophore group including said nitrogen upon addition of an acid on the nitrogen, and wherein an amine salt is formed by reacting said film with a metal salt.

4. A method as set forth in claim 1 wherein the intermediate film comprises one Brilliant Yellow dye, color index No. 364, and wherein the chemical conversion comprises treatment with an acid reagent to convert the dye from yellow to black.

5. A method as set forth in claim 1 wherein the intermediate film comprises Zapon Fast Blue, and wherein the chemical conversion comprises treatment with an acid reagent to convert it to a dark blue.

6. A method as set forth in claim 1 wherein the intermediate film comprises Methylene Blue and wherein the chemical conversion comprises treatment with an acid reagent to convert it to a dark blue.

7. A method as set forth in claim 1 wherein the intermediate film comprises a pH-sensitive dye, and wherein the intermediate film is treated with acidic metal salt.

8. A method as set forth in claim 1 wherein the intermediate film is formed of a solvatochromic compound, and wherein the intermediate film is treated with a substance which develops its color.

9. A method as set forth in claim 1 wherein the intermediate film is formed of a halochromic compound, and wherein the intermediate film is treated with an acid which develops its color.

10. A method as set forth in claim 1 wherein the intermediate film is formed of a halochromic compound, and wherein the intermediate film is treated with an acidic metal salt which develops its color.

11. A method as set forth in claim 1 wherein the intermediate film is formed of a long-chain conjugated organic compound, and wherein the chemical conversion produces chromophore groups in the molecules thereof.

12. A solid permanent optically-polarizing dichroic film of an organic compound having parallelly-oriented relatively-long molecules with lateral groups having a flat steric configuration which is stable on exposure to light and air and which is produced by forming an intermediate film wherein the molecules are oriented in parallel with other adjacent molecules and which is convertible to such dichroic material, and, after the orientation is completed, treating said finally-oriented intermediate with an acid which is a non-solvent of said intermediate and of said organic compound and which will chemically convert said oriented intermediate in situ and at a temperature below the melting point of both said intermediate and said organic compound without further orientation to said permanent dichroic film while still in the solid state and while said final orientation remains unaffected, molecules of said permanent film having at least one chromophoric group resulting from treatment with the acid.

13. A solid permanent optical-polarizing black dichroic film which is stable on exposure to light and air and which is produced by forming an intermediate film of a Brilliant Yellow dye of index number 364 wherein the molecules are oriented in parallel with other adjacent molecules, and after the orientation is completed, treating said finally-oriented intermediate with an acidic material which is a non-solvent of said intermediate and of said dichroic film and which will chemically convert said oriented intermediate in situ and at a temperature below the melting point of both said intermediate and said dichroic film without further orientation to a permanent dichroic film while still in the solid state and while said final orientation remains unaffected.

14. A solid permanent optically-polarizing dark blue dichroic film which is stable on exposure to light and air which is produced by forming an intermediate film of Zapon Fast Blue wherein the molecules are oriented in parallel with other adjacent molecules, and, after the orientation is completed, treating said finally-oriented intermediate with an acidic material which is a non-solvent of said intermediate and of said dichroic material and which will chemically convert said oriented intermediate in situ and at a temperature below the melting point of both said intermediate and said dichroic material without further orientation to a permanent dichroic film while still in a solid state and while said final orientation remains unaffected.

15. A method as set forth in claim 1 wherein the intermediate film is formed of a substance having polar molecules capable of orientation and wherein the chemical conversion is effectuated by a non-volatile material adapted to develop stable dichroism in said film.

16. A method as set forth in claim 1 wherein the intermediate film comprises a dichroic dye or dye-intermediate therefor containing water of hydration, and wherein said film is subjected to a dehydration treatment to remove water of hydration without otherwise decomposing the substance and the dehydrated film is reacted with a metal salt adapted to combine it with the dehydrated substance by molecular association.

17. A method as set forth in claim 1 wherein the intermediate film comprises a dye or dye intermediate therefor containing water of hydration and wherein the film is subjected to a dehydration treatment adapted to remove the water of hydration without otherwise decomposing the substance and the dehydrated film is reacted with a non-volatile substance adapted to combine therewith with formation of a stable dichroic compound.

18. A method as set forth in claim 1 wherein the intermediate film comprises a dye and wherein the dye in said film is treated with a mordanting agent.

19. A method as set forth in claim 1 wherein the intermediate film comprises a soluble dye and wherein said film is treated to convert the soluble dye into an insoluble light-polarizing derivative.

20. The method of preparing a polarizing film which comprises forming a solid film comprising one Brilliant Yellow color index No. 364 dye the molecules of which are oriented in parallel with other adjacent molecules thereof, and, while maintaining the film in said solid oriented condition, treating the film with stannous chloride to convert it from yellow to black.

21. The method of preparing a polarizing film which comprises forming a solid film of Zapon Fast Blue the molecules of which are oriented in parallel with other adjacent molecules thereof, and, while maintaining the film in said solid oriented condition, treating the film with stannous chloride to convert it to a dark blue.

JOHN F. DREYER.

REFERENCES CITED

The following references are of record in the file of this patent:

UNITED STATES PATENTS

| Number | Name | Date |
|---|---|---|
| 1,873,951 | Zocher | Aug. 30, 1932 |
| 2,104,949 | Marks | Jan. 11, 1938 |
| 2,173,304 | Land et al. | Sept. 19, 1939 |
| 2,237,567 | Land | Apr. 8, 1941 |
| 2,246,087 | Bailey et al. | June 17, 1941 |
| 2,255,940 | Rogers | Sept. 16, 1941 |
| 2,286,972 | Kasemann | Apr. 1, 1942 |
| 2,400,877 | Dreyer | May 28, 1946 |
| 2,409,959 | Ryan et al. | Oct. 22, 1946 |

OTHER REFERENCES

Organic Chemistry, Fieser and Fieser, 1944, page 864, published by D. C. Heath & Co., Boston, Mass.